(12) United States Patent
Simons

(10) Patent No.: US 8,365,685 B2
(45) Date of Patent: Feb. 5, 2013

(54) LOOP FOR RESTRAINING PETS

(75) Inventor: Charles Ross Simons, Margate, NJ (US)

(73) Assignee: The Pet Salon, Inc., Margate, NJ (US)

( * ) Notice: Subject to any disclaimer, the term of this patent is extended or adjusted under 35 U.S.C. 154(b) by 74 days.

(21) Appl. No.: 13/113,232

(22) Filed: May 23, 2011

(65) Prior Publication Data

US 2011/0315089 A1  Dec. 29, 2011

Related U.S. Application Data

(60) Division of application No. 12/277,481, filed on Nov. 25, 2008, now abandoned, which is a continuation of application No. 10/342,359, filed on Jan. 14, 2003, now abandoned, which is a continuation-in-part of application No. 10/271,825, filed on Oct. 15, 2002, now abandoned.

(60) Provisional application No. 60/370,045, filed on Apr. 3, 2002.

(51) Int. Cl.
*A01K 27/00* (2006.01)

(52) U.S. Cl. ........................................ 119/856; 119/756

(58) Field of Classification Search .................. 119/753, 119/755–757, 856, 863, 795, 797
See application file for complete search history.

(56) References Cited

U.S. PATENT DOCUMENTS

| 255,574 | A | 3/1882 | Bonelli |
|---|---|---|---|
| 1,316,163 | A | 9/1919 | Kennedy |
| 1,405,632 | A | 2/1922 | Sladky |
| 2,132,556 | A | 10/1938 | Blackshaw |
| 2,438,979 | A | 4/1948 | Short |
| 2,902,976 | A | 9/1959 | Wilson |
| 2,909,154 | A | 10/1959 | Thomas |
| 3,120,836 | A | 2/1964 | Brauning |
| 3,208,432 | A | 9/1965 | Fisk |
| 3,266,464 | A | 8/1966 | Davis |
| 3,458,188 | A | 7/1969 | Infante |
| 4,261,296 | A | 4/1981 | Rosenberg |
| RE32,052 | E | 12/1985 | Rosenberg et al. |
| 4,570,577 | A | 2/1986 | Bellinger |
| 4,828,210 | A | 5/1989 | Anderson et al. |
| 5,005,527 | A | * 4/1991 | Hatfield ........................ 119/793 |
| 5,167,203 | A | 12/1992 | Scott et al. |
| 5,269,260 | A | 12/1993 | Farrell et al. |
| 5,433,288 | A | 7/1995 | James |
| 5,666,909 | A | 9/1997 | Dupre |
| 5,732,660 | A | * 3/1998 | David et al. ................... 119/792 |
| 5,749,325 | A | 5/1998 | Albanese |
| 5,806,467 | A | 9/1998 | Arakawa |
| 6,192,835 | B1 | 2/2001 | Calhoun et al. |
| 6,244,611 | B1 | 6/2001 | Davis |
| 6,382,139 | B1 | 5/2002 | Rhodes |
| 6,490,999 | B1 | 12/2002 | Boys |
| 6,516,753 | B1 | 2/2003 | Taylor |
| 6,675,742 | B1 | 1/2004 | Shiraki |
| 7,243,825 | B2 | * 7/2007 | Weisenfeld ................... 224/311 |

OTHER PUBLICATIONS

The Groomer's Helper—The Safest and Surest Canine and Feline Grooming Restrain on the Market. Website printout of www.petsalon.com.

* cited by examiner

*Primary Examiner* — Kimberly Berona
(74) *Attorney, Agent, or Firm* — Connolly Bove Lodge & Hutz LLP

(57) ABSTRACT

A flexible loop for restraining animals during handling such as during grooming or examination or operation or in bath tubs with a swivel snap closure mechanism or fixed means at its top and, at the bottom of the flexible loop, fixed means. The loop is suitable for attachment to a grooming arm or to tethers to cross-tie the animal in place. The fixed means is preferably a D-ring.

19 Claims, 9 Drawing Sheets

LOOP FOR RESTRAINING PETS

PRIORITY

Priority is claimed as a divisional application to U.S. patent application Ser. No. 12/277,481, filed Nov. 25, 2008 now abandoned, which is a continuation application to U.S. patent application Ser. No. 10/342,359, filed Jan. 14, 2003 now abandoned, which is a continuation-in-part of U.S. patent application Ser. No. 10/271,825, filed Oct. 15, 2002 now abandoned, which claims domestic priority based on provisional application No. 60/370,045, filed Apr. 3, 2002. The disclosure of the aforementioned priority documents are incorporated herein by reference in their entirety.

BACKGROUND OF THE INVENTION

1. Field of the Invention

The field of the present invention is restraint loops for use by pet groomers and other pet or animal handlers.

2. Background

Grooming loops have long been used by groomers to position and/or restrain pet animals, particularly dogs and cats, on a grooming table or platform while the animal is being groomed. The loop is typically connected to an eye-bolt hanging from the upper end of an L-shaped grooming arm, often by a swivel snap closure mechanism that engages the eye-bolt. The loop is placed over the animal's head to rest around its neck. With the animal's movement limited or restricted by the loop, the groomer then cuts and combs fur, removes fur from the paws, mouth, nose and eye areas, other parts of the anatomy, pares toenails, sprays and does all the procedures for proper grooming of the particular breed being groomed. Similarly, loops and other restrain mechanisms have been used by animal handlers other than groomers, such as veterinarians who restrain pets during examination and minor surgery.

However, grooming and examination loops and other restrain mechanisms have had a number of disadvantages. The pet undergoing grooming or examination can move in a substantially sized circle creating a greater area in which it could bite the handler, turn around and chew through the loop or restrain, and even fall off the platform on which the pet is placed, leaving it hanging with the loop or other restrain tightly around its neck. Moreover, since the pet is actually hanging in the loop or other restrain, even while the pet is on the platform, the loop can press uncomfortably around its throat. The pet's ability to struggle causes discomfort to it and its ability to move can make a handler's job difficult or even dangerous as the pet can fall or bite, unless muzzled.

In U.S. Pat. No. 4,828,210 to Anderson et al. an adjustable lock device suitable for being clamped at one end to the vertical portion of a grooming arm is described. It is stated that the device can be attached by a snap closure mechanism at its opposite end to a training aid combination collar and muzzle, which is sold under the trademark GENTLE LEADER®. This commercially available collar and muzzle has an O-ring stitched inside its end portion. Attempts have been made to use the combination of the adjustable lock device attached to the collar and muzzle at the O-ring for grooming.

However, this combination of parts does not work well since the pet is not attached to the top of the L-portion of the grooming arm and can still have a substantial area for movement. Moreover, the limitations imposed by attachment to the vertical portion of the grooming arm and the muzzle tend to make the pet less accessible during grooming. In addition, when the pet is muzzled its mouth area and some parts of the face cannot be groomed.

SUMMARY OF THE INVENTION

The present invention is directed toward a loop for handling pets or other animals that accommodates the handler exercising control over the animal being groomed or examined or operated upon without having to use both hands or require the need of an assistant.

With this loop, the animal has only a small area in which it can move while at the same not being encumbered with uncomfortable pressure upon its throat.

In the case of grooming, the groomer's loop is attached to the eye-bolt on the top of the L-portion of the grooming arm and, at its opposite end, is attached to a tether, which in turn is firmly attached to the vertical section of the grooming arm or alternatively to a separate arm-clamp assembly, with the loop not exerting pressure on the pet's throat, but rather on its stronger back or side. In this manner the animal is cross-tied and the tether pulls away from the pet's throat and the remaining pressure is exerted on the stronger sides of the pet's neck.

For examinations, the loop has means for attachment to upper and lower positions on the vertical back of an examination table.

Further, with use of the loop, the handler can safely work on all parts of the pet's anatomy without substantial danger of being bitten or losing control over the pet.

Advantages of the loop will be apparent from the following description.

In accordance with certain of its aspects this invention relates to a loop for restraining pets or other animals comprising at one end a flexible loop stitched at its top around a swivel snap closure mechanism, there being at the opposite end from said swivel snap mechanism fixed means suitable for attaching said loop to another swivel snap closure mechanism.

In accordance with certain additional of its aspects this invention relates to a loop for restraining pets having fixed means at each end suitable for attachment to swivel snap closure mechanisms that are typically at the ends of tethers that are connected to arm-clamp assemblies. In this aspect of the invention, the loop is particularly effective for use during veterinary examinations or minor operations.

The swivel snap closure mechanism on the flexible loop is present particularly when a pet is being groom to secure connecting the loop to the eye-bolt on the upper L-portion of the grooming arm of a grooming table. The swivel snap closure mechanism facilities use of the loop by either a right-handed or left-handed groomer. Moreover, due to the swivel movement, the pet cannot twist the loop, thereby avoiding the loop tightening around its neck. The fixed means is at the opposite end of the flexible loop, that is at about or exactly 180° from the opposite end (or at the bottom center), from the swivel snap closure mechanism. When the flexible loop is further engaged, as described below, the pet is effectively cross-tied and the loop is allowed to be pulled away from the pet's throat, thereby alleviating the discomfort associated with older loops and greatly reducing possible injury to the pet and the groomer.

The fixed means on the flexible loop for grooming or examination or minor surgery may be a grommetted hole, wherein the hole is circular, square, triangular, D-shaped or of other convenient geometric shape and the grommet is shaped to the hole and protects it by engaging the front and rear sides of the flexible loop around the perimeter of the hole. More preferably, the fixed means has a geometric shape, such as a circle, square, triangle, D-shape or other convenient geometric shape, typically made of metal or plastic, and is fixed in place by stitching at the bottom of the flexible loop. Most preferably it is a D-ring, stitched into place. For veterinary purposes or other appropriate purposes the fixed means are at both ends of the loop in order to be able to engage two tethers.

In a preferred aspect of the invention a side of the loop contains a quick release buckle that can be opened quickly to easily release and free the pet from the loop, particularly in an emergency, without having to take the loop over the head of the pet. The quick release buckle permits the handler's hands to be behind the pet's neck when attaching or removing the loop to or from the pet, instead of a hand being in front of the pet's mouth, as would be the case with a loop that does not contain the quick release buckle, thus making the groomer safer from being bitten by the pet when putting the loop on or taking it off. It is also desirable to place a positive cam-snap on the loop in order to conveniently size the loop according to the size of the pet. In addition to facilitating the size of the loop, when the cam-snap is present, its snap portion is desirably positioned when the pet is groomed such that it opens and closes on the opposite side from the quick release buckle. This permits the groomer to readily release the loop with either hand, for instance with a hand not engaged in grooming, with the hand closest to either the quick release buckle or to the cam-snap, or by preference depending on whether the groomer is right-handed or left-handed. When the loop is used for restraining pets being examined or operated upon, the cam-snap is preferably on the same side as the quick release buckle.

With further regard to the respective position of the cam-snap, when present, and the quick release buckle, while positioning a pet on a grooming platform a groomer holds the pet with one hand and does not release the pet until the loop is attached to it and also to the grooming arm and optionally an arm-clamp assembly. Thus, with the other hand the groomer can appropriately size the loop to the pet and close the cam-snap. It is easier to snap the cam-snap closed when its snap portion is positioned on the opposite side of the loop from the quick release buckle since the groomer's hand that holds the pet is typically on the same side of the loop as the quick release buckle. Thus, opposite positioning is preferred as being ergonomically effective for use of the groomer's left or right hand, as needed.

In accordance with a further aspect, this invention relates to pet grooming with the fixed means on the bottom of the loop being attached to a swivel snap closure mechanism on a tether that can be clamped to the vertical portion of the grooming arm. In this manner the combination of the flexible loop and the tether is assembled by being attached to the top L-portion of a grooming arm and to its vertical portion or to a separate arm-clamp assembly.

When the combination is completely assembled and in use, the swivel snap closure mechanism of the flexible loop is attached to the eye-bolt at the top of the L-section of the grooming arm; is looped over a pet's head with the fixed means, such as a D-ring stitched into place, being positioned below the center of the dog's throat; and connected at the fixed means to a swivel snap closure mechanism on a tether device that is attached to the vertical portion of the grooming arm or separate arm-clamp assembly. With the D-ring or other fixed means at the center of the pet's throat, the pet is unable to reach and chew the loop with its mouth.

The flexible loop is made of material such as Nylon webbing, Polyester webbing cotton webbing, cloth, or other similar materials.

A tether that is particularly useful for attachment at the fixed means of the loop is the adjustable lock with a tether containing a swivel snap closure mechanism and adjustable clamp described in U.S. Pat. No. 4,828,210 to Anderson et al., the disclosure of which is incorporated herein by reference. As described in that patent the tether line can be loosened or tightened by moving it in a slot on the adjustable clamp. Thus, in the present invention the clamp assembly of the lock and tether of U.S. Pat. No. 4,848,210 is locked and clamped to the vertical portion of the grooming arm or separate arm-clamp assembly and attached at it swivel snap closure mechanism to the fixed means of the flexible loop and the flexible loop is attached at its swivel snap closure mechanism to the eye-bolt on the top L-portion of the grooming arm. This permits a groomer to give a pet a degree of slack so that it can move a little backward and forward during grooming and, therefore, increases its comfort level during the procedure. When the lock and tether is used with the GENTLE LEADER® collar and muzzle, as described in U.S. Pat. No. 4,848,210, the pet is less accessible and it is difficult for the groomer to effectively groom the face and head of the muzzled pet.

When a separate arm-clamp assembly is employed, instead of tethering the pet being groomed to the vertical portion of the L-shaped grooming arm, the grooming arm may be positioned to the side of the pet and a separate height adjustable arm-clamp assembly is attached to the grooming platform to cross-tie the pet.

Depending on the size of the pet or the part of the body being groomed, the position of the clamp to the vertical part of the grooming arm or separate arm-clamp assembly can be raised or lowered. For instance with the clamp placed low, in a first position near the platform, it is particularly convenient for the groomer to pare toenails. When the clamp is in an intermediate, second position on the grooming arm, it is particularly convenient to groom the pet's legs, as the pet is not able to drop its head to attempt to bite the groomer. When the clamp is in a high, third position, the pet is effectively muzzled by the flexible loop and the groomer can then safely groom the pet's beard, face and eyes areas, which parts of the pet's anatomy are otherwise of concern since they are close to the mouth and often require assistance from another person.

In accordance with another aspect, this invention relates to a loop suitable for use in examining or operating on animals which comprise a flexible loop stitched at both of its ends around fixed means suitable for attaching said loop to tethers.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
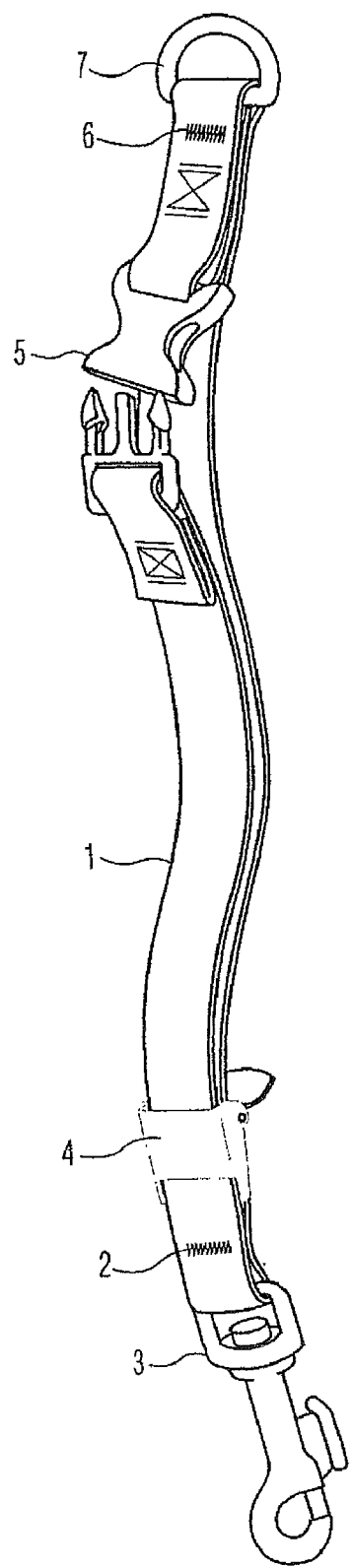
FIG. 1 illustrates a plan view of the loop of the invention particularly suitable for restraining pets during grooming.

Turning in detail to the drawings, FIG. 1 illustrates a flexible loop 1 shown with stitching 2 holding in place a swivel snap closure mechanism 3 on its upper end, a positive cam-snap 4 on one side of the loop in an open position, a quick release buckle 5 on the opposite side of the loop, also in an open position, stitching 6 close to the bottom end of the loop and a D-ring 7 fixed in position 180° from the swivel snap closure mechanism. As shown in FIG. 1, and in other figures, the quick release buckle 5 is disposed more proximate to the stitching 6 and D-ring 7 than it is to the stitching 2 and the swivel snap closure mechanism 3.

Figure 2:
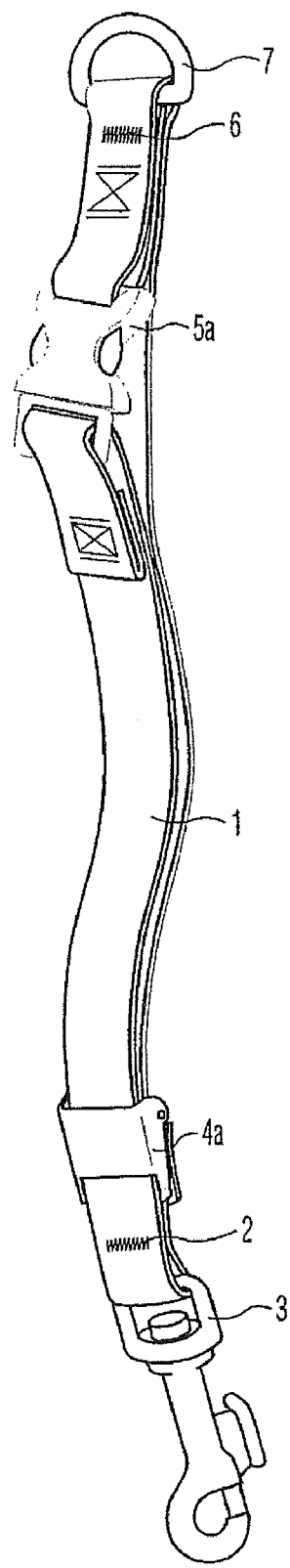
FIG. 2 illustrates a further plan view of the loop of the invention.

In FIG. 2, the flexible loop 1 is again shown with the cam-snap assembly 4a and the quick release buckle 5a in a closed position.

Figure 3:
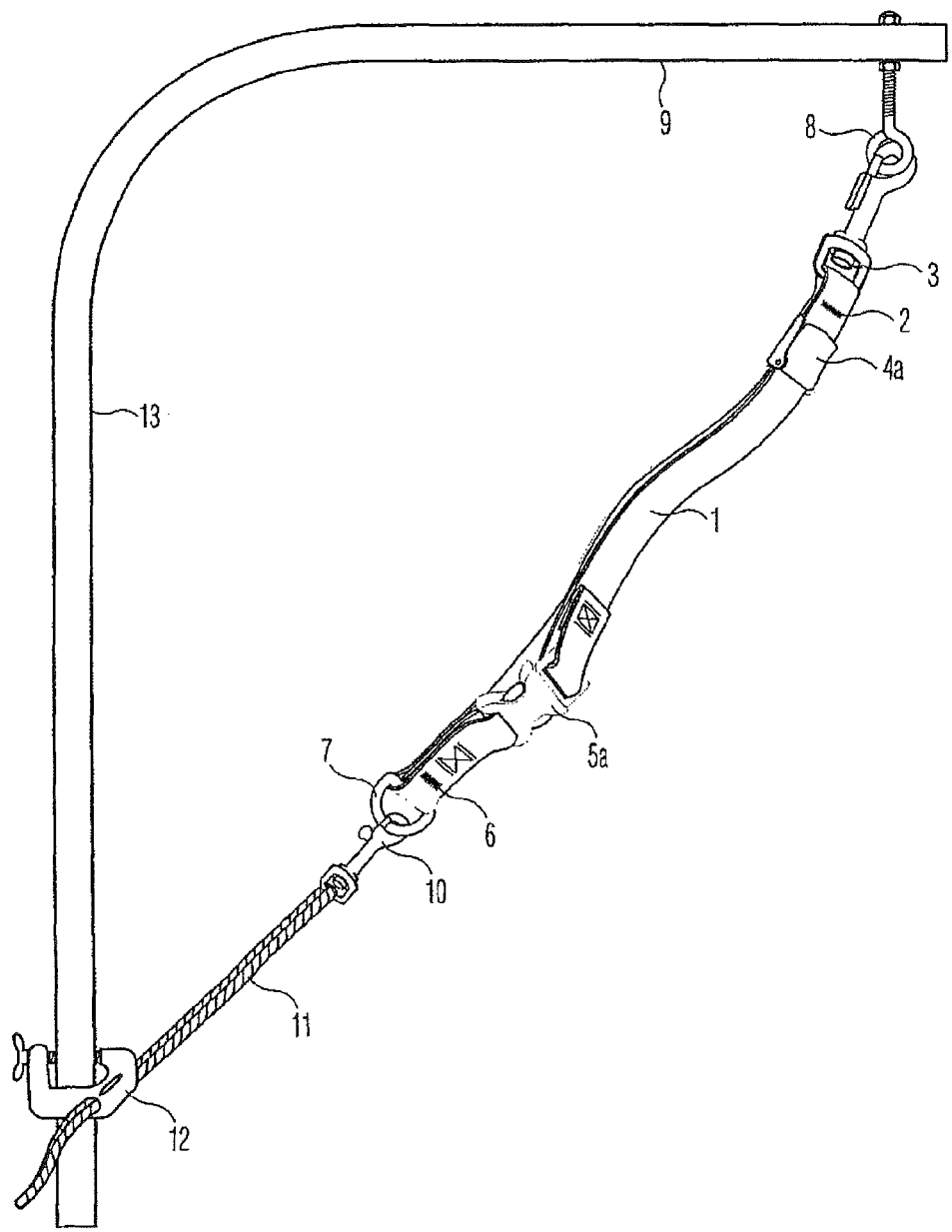
FIG. 3 illustrates a plan view of the loop attached at its opposite ends to a grooming arm at an eye-ring on its top L-section and to a lock and tether device that is clamped to the vertical section of the grooming arm.

In FIG. 3, the flexible loop 1 in FIG. 2 is shown with the swivel snap closure mechanism 3 attached to an eye-bolt 8 on the top L-portion 9 of the grooming arm. At its opposite end of the flexible loop 1 is attached at fixed ring 7 to a snap closure mechanism 10 at one end of a tether 11 that is clamped with adjustable clamp 12 to the vertical portion 13 of the grooming arm.

Figure 4A:
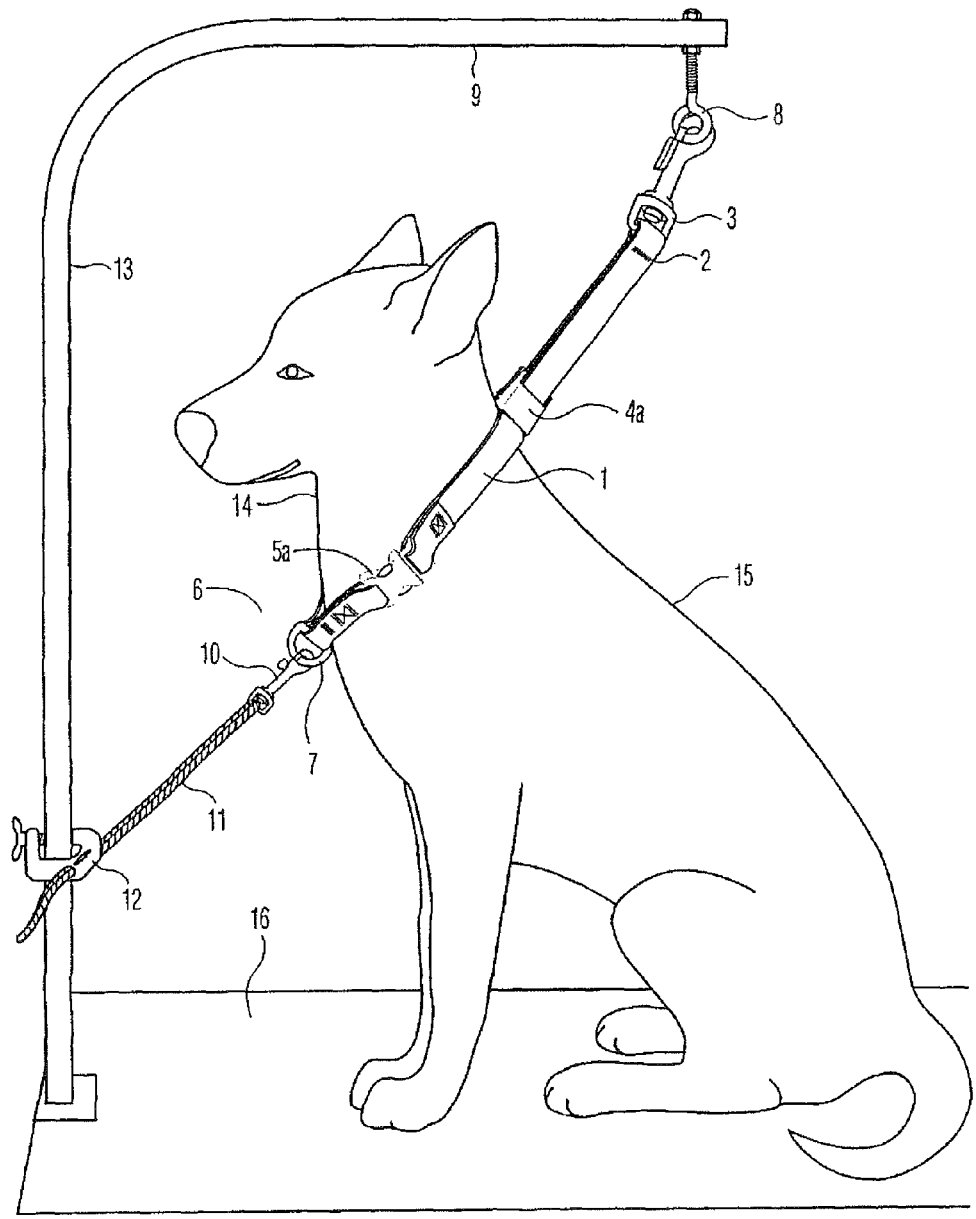
FIGS. 4A, 4B and 4C illustrate side views of a dog on a grooming platform wherein the flexible loop is attached at its to the vertical L-section of the grooming arm and is attached at its other end to the tether and lock device, with the tether and lock device clamped to the vertical section of the grooming arm in, respectively, a first, low position; a second, intermediate position; and a third, high position, with respect to the platform, thereby cross-tying the dog.

In FIG. 4A, the flexible loop 1, as shown in FIG. 3 attached to tether 11, is positioned looped around the neck 14 of a dog 15 placed on the platform 16. The adjustable clamp 12 of the tether 11 is clamped to the vertical portion 13 of the grooming arm in a low position close to the platform 16, upon which the dog 15 is placed. This position facilitates paring of the dog's toenails.

Figure 4B:
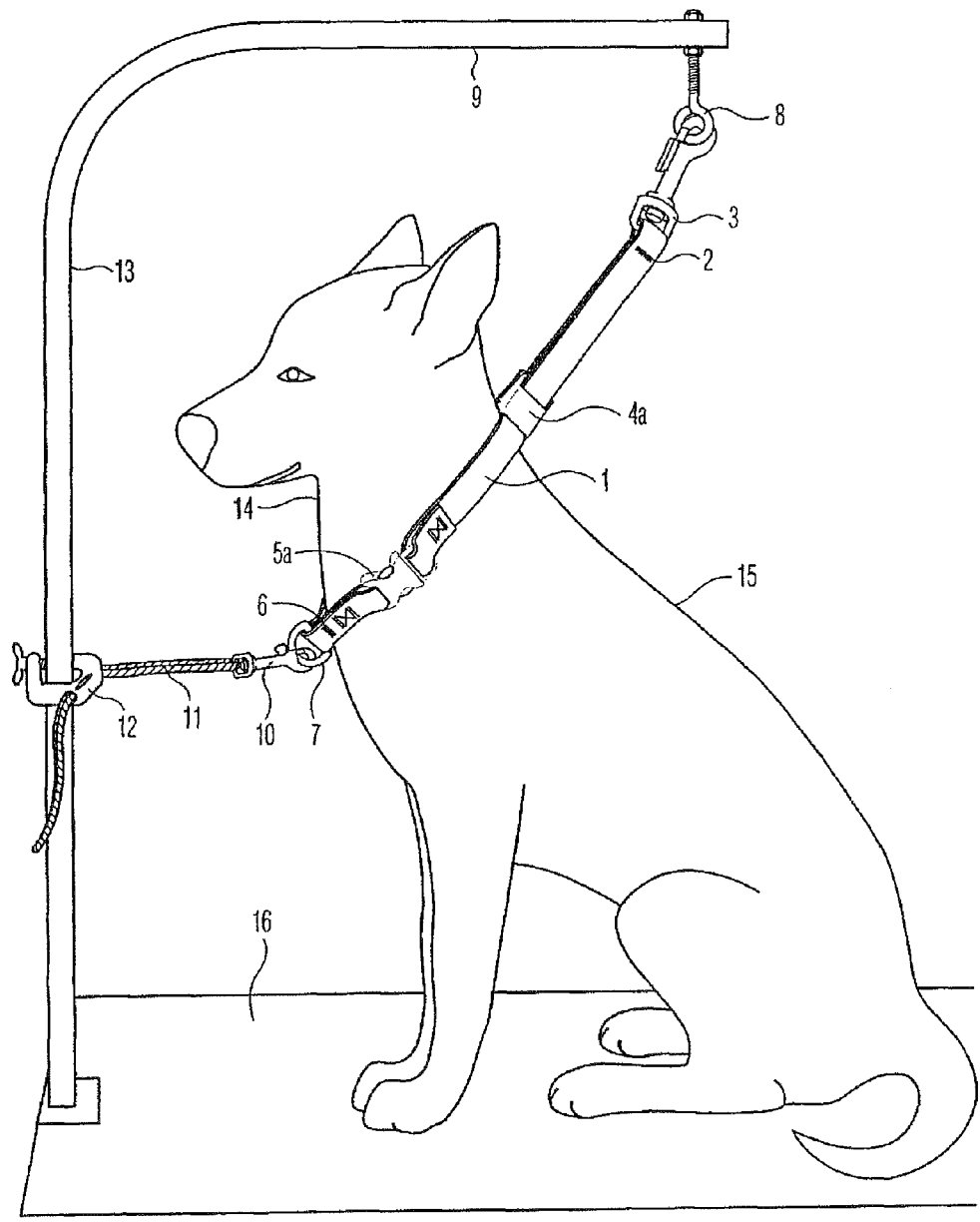

FIG. 4B is similar to FIG. 4A, except that the clamp assembly 12 is clamped to the vertical portion 13 of the grooming arm in an intermediate position on the arm, thereby limiting the ability of the dog 15 to lower its head toward its legs. This position of the clamp assembly is particularly helpful to the groomer when grooming the dog's legs.

Figure 4C:
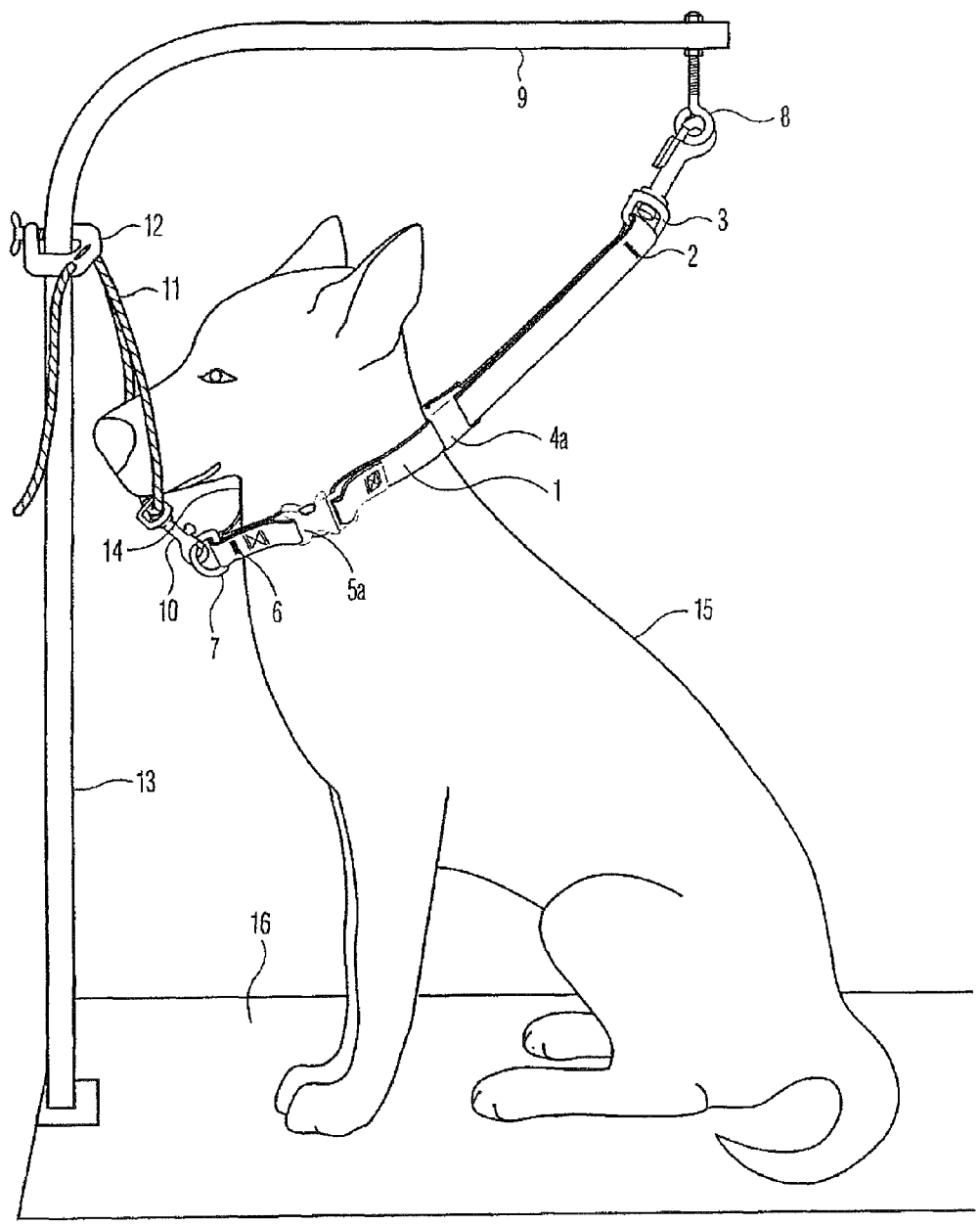

FIG. 4C is similar to FIGS. 4A and 4B except that the clamp assembly 12 is clamped to the vertical portion 13 of the grooming arm in a high position on the arm, thereby effectively muzzling dog 15. This position of the clamp assembly is particularly helpful to the groomer when grooming the dog's head.

Figure 5:
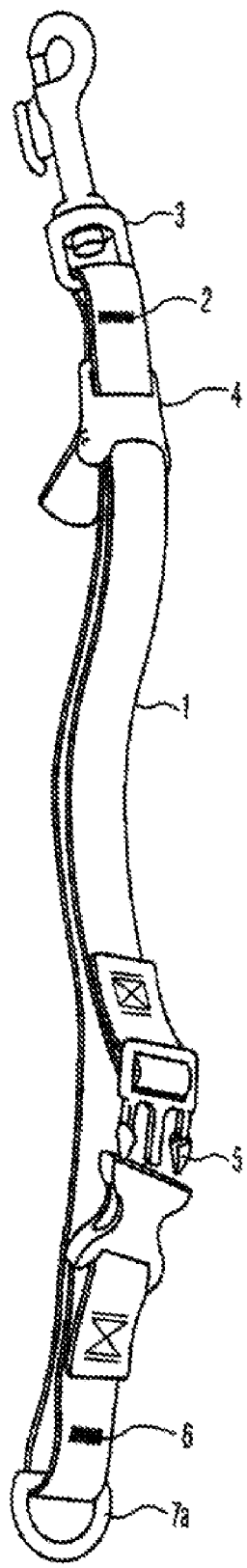
FIG. 5 illustrates a plan view of the flexible loop with the stitching open to reveal a D-ring.

FIG. 5 shows the flexible loop 1 with the stitches 6 open to expose D-ring 7A.

Figure 6:
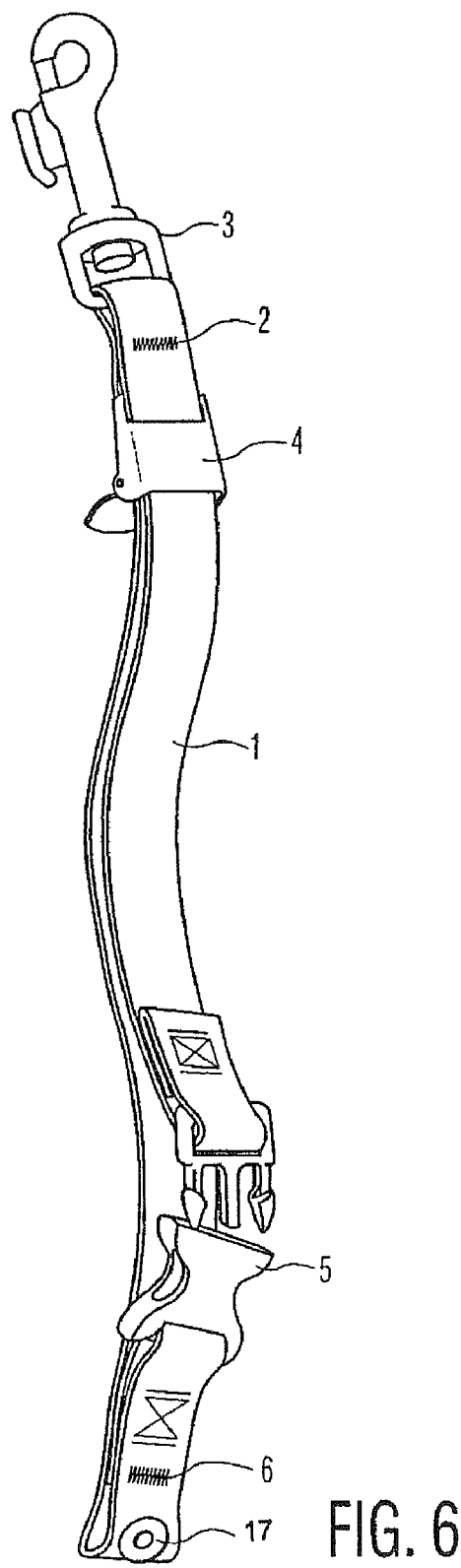
FIG. 6 illustrates a plan view of an alternate aspect wherein the fixed means is a hole surrounded by a grommet.

FIG. 6 shows an alternate flexible loop 1 wherein the fixed means is a grommet hole 17.

Figure 7:
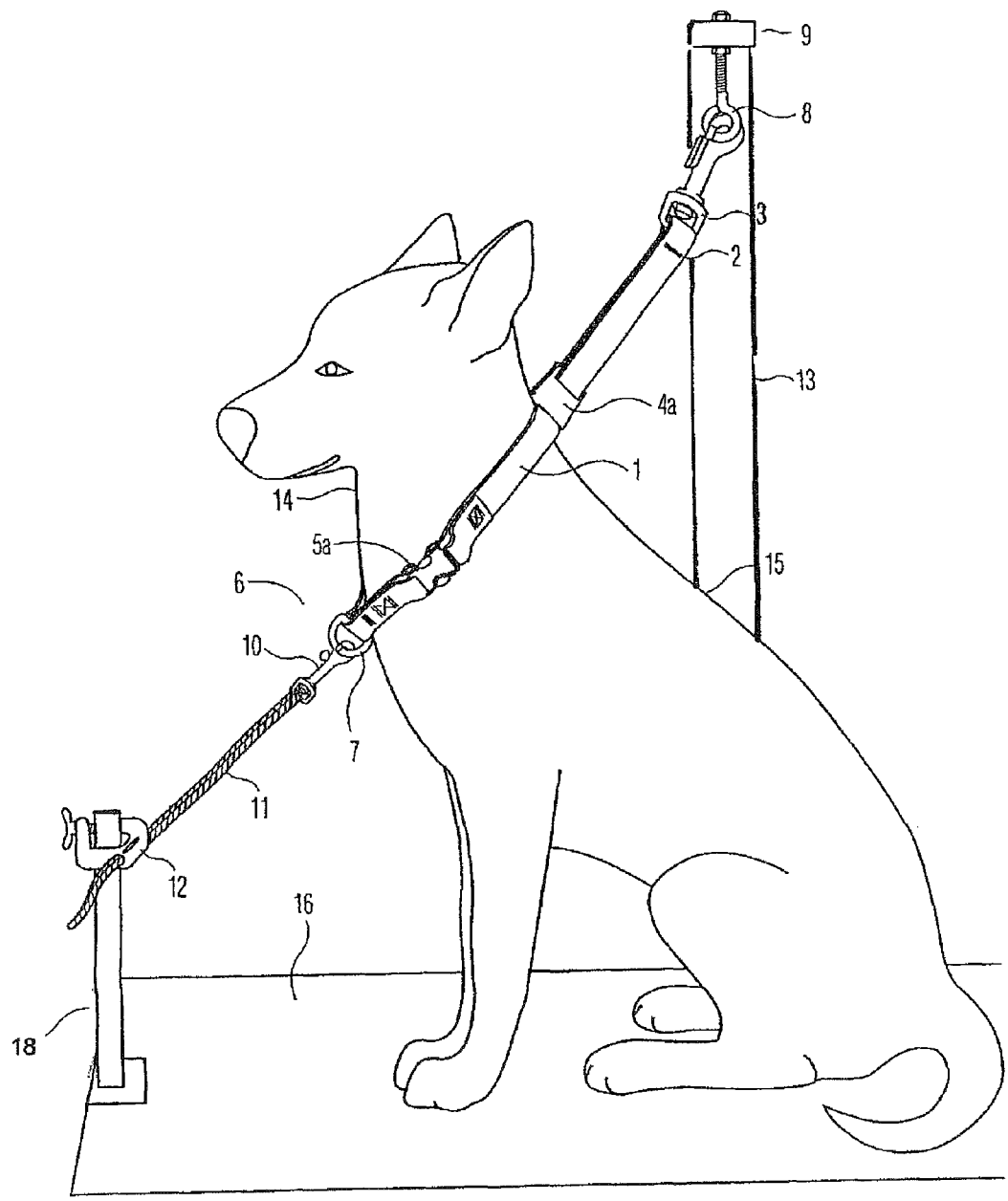
FIG. 7 illustrates a side view of an alternate embodiment to FIG. 4A wherein the grooming arm is positioned to the side of the dog and a separate height adjustable arm-clamp assembly is positioned for cross-tying the dog.

FIG. 7 is an alternate embodiment from that depicted in FIG. 4A wherein the L-shaped grooming arm having a vertical portion 13 and a top portion 9 is positioned to the side of the dog and the D-ring 7 is attached to the tether 11 emanating from the height adjustable arm-clamp assembly 18.

The cam-snap (4 in FIGS. 1, 5 and 6 and 4A in FIGS. 2, 4A, 4B, 4C and 7) is positioned such that the snap portion opens and closes on the opposite side from the quick release buckle (5 in FIGS. 1, 5, and 6 and 5A in FIGS. 2, 4A, 4B and 4c). In FIG. 3 the snap portion of the cam-snap 4A is shown on the same side as the quick release buckle 5A.

When the loop is adapted for use by a veterinarian for examining or performing a minor operation and preferably also for a handler putting animals in bath tubs, the snap closure shown on the loop at 3 in FIGS. 1-7 is replaced by fixed means similar to that at 7 in FIGS. 1-5 and 7 and 17 in FIG. 6.

Furthermore, for purposes of veterinary examinations the cam-snap is preferably positioned as shown at 4A in FIG. 3.

Moreover, for veterinary examinations and operations the platform is desirably a height adjustable examination table that contains vertical back portion, for instance as described in U.S. Pat. No. 4,261,296 of Rosenberg and U.S. Reissue Pat. No. 32,052 to Rosenberg et al., the disclosures of which are incorporated herein by reference. For purposes of the present invention the only mechanisms that need to be attached to vertical back of the incorporated herein tables or similar examination tables are two arm-clamp assemblies, each with tethers emanating there from, which are clamped to the vertical back at its top and at a lower side. The tethers are readily attached to the fixed means, such as D-rings, at the ends of the loop.

Although the present invention has been described with reference to the embodiments set forth, those skilled in the art will recognize that changes may be made in form and detail without departing from the spirit and scope of the invention. For instance, the loop may be used by pet grooms or veterinarians for a variety of animals, including, but not limited to, dogs, cats, rabbits or other small animals. Likewise, the grooming loop can be used by many professionals and aides who handle domestic and outdoor animals and have need to control their movements, while still giving them considerable freedom of movement. The include, but are not limited to, groomer's aides, veterinarian technicians, animal shelter personnel, kennel personnel, zoo personnel, animal control officials, game wardens or other animal handlers.

What is claimed is:

1. A restraint for an animal, the restraint comprising:
   a looped strap forming first and second connection loops, with first and second sides of the looped strap extending there between, wherein the first and second sides of the looped strap have substantially equal lengths;
   a first connector affixed at the first connection loop;
   a second connector affixed at the second connection loop;
   a quick-release connector disposed in line with one of the first or second opposing sides and adapted to open the loop, the quick-release connector being more proximate to one of the first and second connection loops than to the other of the first and second connection loops; and
   a clamp slidably disposed over the first and second sides, wherein the clamp is adapted to divide the loop into a primary loop and a secondary loop and to maintain a size of the primary loop around the animal's neck, and the quick-release connector is configured to open the primary loop.

2. The restraint of claim 1, wherein the first connector comprises a swivel-snap closure mechanism.

3. The restraint of claim 1, wherein the second connector comprises a D-ring.

4. The restraint of claim 1, wherein the second connector comprises a grommet.

5. The restraint of claim 1, wherein the clamp comprises a cam-snap.

6. An animal restraint system comprising:
   a first securing arm;
   a second securing arm; and a restraint comprising:
  a looped strap forming first and second connection loops, with first and second sides of the looped strap extending there between, wherein the first and second sides of the looped strap have substantially equal lengths;
  a first connector affixed at the first connection loop and coupled to the first securing arm, wherein the first securing arm is configured to couple to the first connector above an animal's head;
  a second connector affixed at the second connection loop and coupled to the second securing arm, wherein the second securing arm is configured to couple to the second connector at or below the animal's head;
  a quick-release connector disposed in line with one of the first or second opposing sides and adapted to open the loop, the quick-release connector being more proximate to one of the first and second connection loops than to the other of the first and second connection loops; and
  a clamp slidably disposed over the first and second sides, wherein the clamp divides the loop into a primary loop and a secondary loop and is configured to maintain a size of the primary loop when placed around the animal's neck, and the quick-release connector is configured to open the primary loop.

7. The restraint of claim 6, wherein the first connector comprises a swivel-snap closure mechanism.

8. The restraint of claim 6, wherein the second connector comprises a D-ring.

9. The restraint of claim 6, wherein the second connector comprises a grommet.

10. The restraint of claim 6, wherein the clamp comprises a cam-snap.

11. The restraint of claim 6, wherein the clamp is configured to adjust and maintain the size of the primary loop around the animal's neck while the primary loop is around the animal's neck.

12. The restraint of claim 6, wherein the first and second securing arms are integrated in an L-shaped configuration.

13. A method of restraining an animal, the method comprising:
  placing the animal adjacent each of a first securing arm and a second securing arm;
  placing a restraint around the animal's neck, the restraint comprising:
    a looped strap forming first and second connection loops, with first and second sides of the looped strap extending there between, wherein the first and second sides of the looped strap have substantially equal lengths;
    a first connector affixed at the first connection loop;
    a second connector affixed at the second connection loop;
    a quick-release connector disposed in line with one of the first or second opposing sides and adapted to open the loop, the quick-release connector being more proximate to one of the first and second connection loops than to the other of the first and second connection loops; and
    a clamp slidably disposed over the first and second sides, wherein the clamp divides the loop into a primary loop and a secondary loop and is configured to maintain a size of the primary loop, which is placed around the animal's neck, and the quick-release connector is configured to open the primary loop;
  coupling the first connector to the first securing arm above the animal's head; and
  coupling the second connector to the second securing arm at or below the animal's head, wherein the second connector pulls the primary loop away from the animal's throat.

14. The restraint of claim 13, wherein the first connector comprises a swivel-snap closure mechanism.

15. The restraint of claim 13, wherein the second connector comprises a D-ring.

16. The restraint of claim 13, wherein the second connector comprises a grommet.

17. The restraint of claim 13, wherein placing the restraint around the animal's neck includes:
  placing the primary loop around the animal's neck; and
  slidably adjusting the clamp to reduce the size of the primary loop.

18. The restraint of claim 13, wherein the clamp comprises a cam-snap.

19. The restraint of claim 13, wherein the first and second securing arms are integrated in an L-shaped configuration.

* * * * *